United States Patent
Sakhnini et al.

(10) Patent No.: US 11,916,712 B2
(45) Date of Patent: Feb. 27, 2024

(54) FDM UES WITH DIFFERENT GUARD INTERVALS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/451,559

(22) Filed: Oct. 20, 2021

(65) Prior Publication Data

US 2023/0117317 A1 Apr. 20, 2023

(51) Int. Cl.
*H04L 27/26* (2006.01)
*H04W 56/00* (2009.01)

(52) U.S. Cl.
CPC ...... *H04L 27/2607* (2013.01); *H04L 27/2636* (2013.01); *H04W 56/004* (2013.01)

(58) Field of Classification Search
CPC .......... H04L 27/2607; H04L 27/2636; H04W 56/004
See application file for complete search history.

(56) References Cited

U.S. PATENT DOCUMENTS

| | | | |
|---|---|---|---|
| 2017/0127411 A1* | 5/2017 | Miao | H04L 27/2607 |
| 2018/0367355 A1* | 12/2018 | Pan | H04L 27/2607 |
| 2019/0387504 A1* | 12/2019 | Jung | H04L 27/2666 |
| 2020/0052947 A1* | 2/2020 | Sahin | H04W 72/0453 |
| 2021/0068201 A1* | 3/2021 | Xiong | H04W 56/001 |

* cited by examiner

*Primary Examiner* — Jackie Zuniga Abad
(74) *Attorney, Agent, or Firm* — Procopio, Cory, Hargreaves & Savitch LLP

(57) ABSTRACT

Method and apparatus to use different GI sequences for different FDM UEs. The apparatus calculates a GI of each UE from a set of UEs based at least on a delay spread associated with each UE from the set of UEs. The apparatus multiplexes data and the GI of each respective UE from the set of UEs to generate a waveform. The apparatus transmits the waveform to the set of UEs. The apparatus may receive, from each UE from the set of UEs, the delay spread associated with each UE from the set of UEs. The apparatus may multiplex the GI of each respective UE from the set of UEs prior to performing a DFT operation on the GI and the data. The apparatus may multiplex the GI of each respective UE from the set of UEs after performing an IDFT operation to generate the waveform.

26 Claims, 14 Drawing Sheets

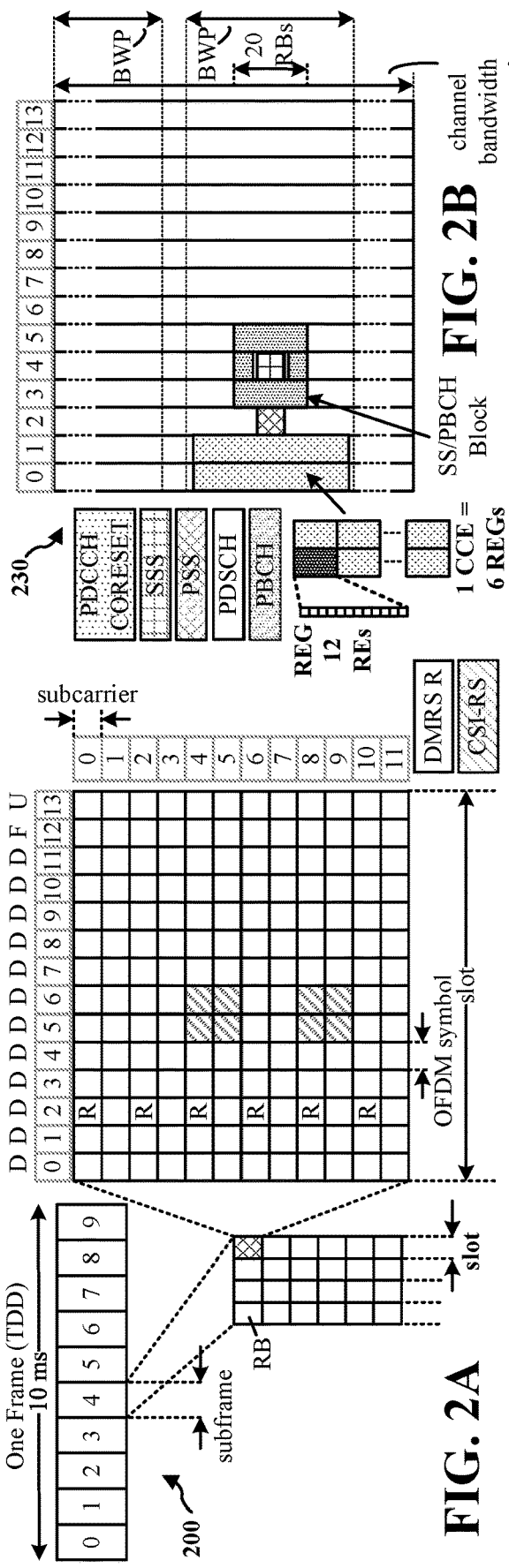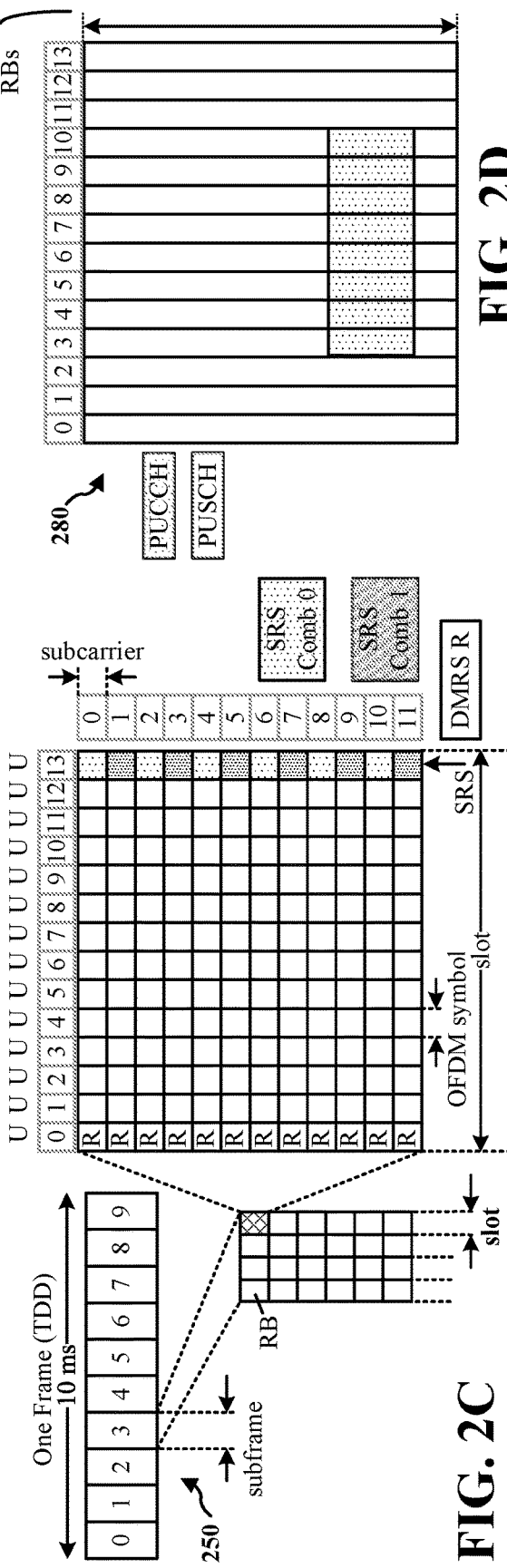

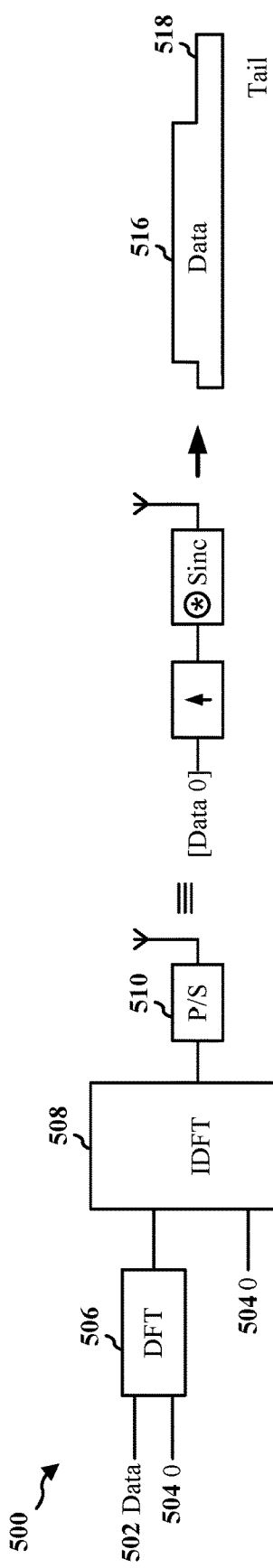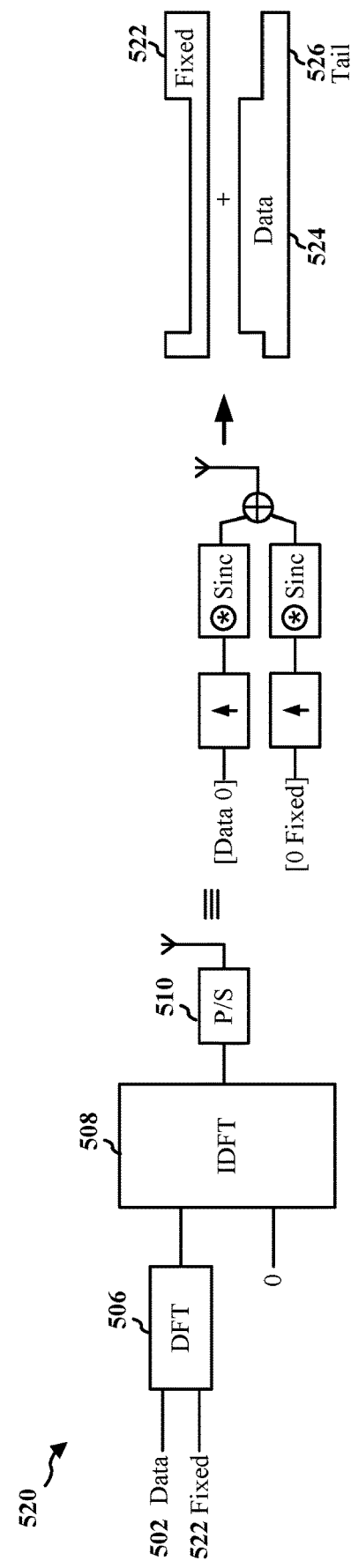
FIG. 5A
FIG. 5B

FDM UES WITH DIFFERENT GUARD INTERVALS

TECHNICAL FIELD

The present disclosure relates generally to communication systems, and more particularly, to a configuration to use different guard interval (GI) sequences for different frequency division multiplexed (FDM) user equipments (UEs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a base station. The device may be a processor and/or a modem at a base station or the base station itself. The apparatus calculates a guard interval (GI) of each user equipment (UE) from a set of UEs based at least on a delay spread associated with each UE from the set of UEs. The apparatus multiplexes data and the GI of each respective UE from the set of UEs to generate a waveform. The apparatus transmits the waveform to the set of UEs.

In an aspect of the disclosure, a method, a computer-readable medium, and an apparatus are provided. The apparatus may be a device at a UE. The device may be a processor and/or a modem at a UE or the UE itself. The apparatus receives, from a base station, a configuration for a guard interval (GI). The apparatus receives, from the base station, a waveform including data and the GI based at least on the configuration for the GI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 5A is a diagram illustrating an example of a GI implementation using zero-tail (ZT).

FIG. 5B is a diagram illustrating an example of a GI implementation using unique word (UW).

DETAILED DESCRIPTION

Figure 1:
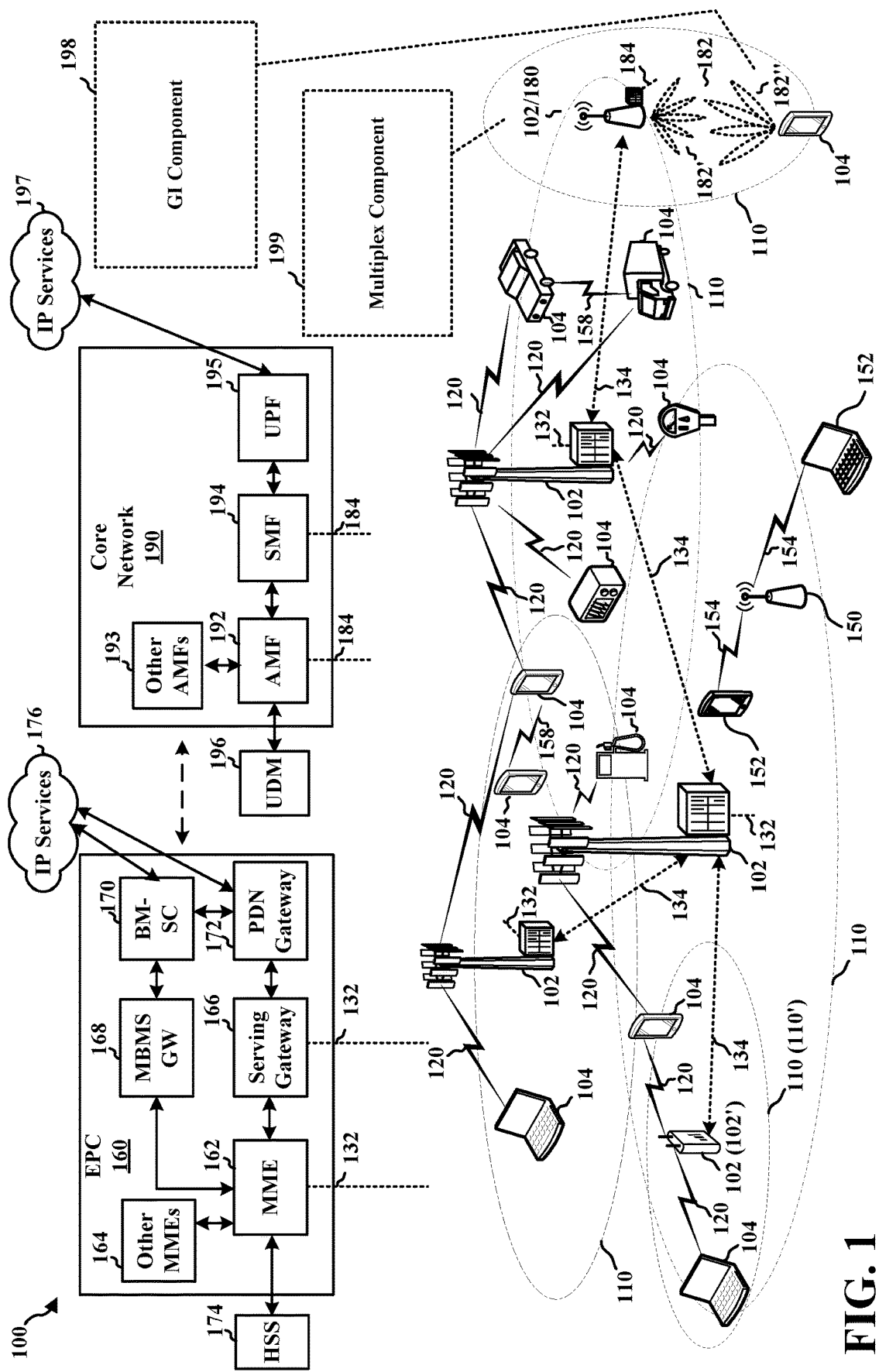
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to receive a multiplexed waveform from a base station using different GI configurations. For example, the UE 104 may comprise a GI component 198 configured to receive a frequency domain multiplexed waveform from a base station using different GI configurations. The UE 104 may receive, from a base station 180, a configuration for a GI. The UE 104 may receive, from the base station 180, a waveform including data and the GI based at least on the configuration for the GI.

Referring again to FIG. 1, in certain aspects, the base station 180 may be configured to multiplex data for different UEs using different GI configurations. For example, base station 180 may comprise a multiplex component 199 configured to multiplex data for different UEs using different GI configurations. The base station 180 may calculate a GI of each UE 104 from a set of UEs based at least on a delay spread associated with each UE from the set of UEs. The base station 180 may multiplex data and the GI of each respective UE 104 from the set of UEs to generate a waveform. The base station 180 may transmit the waveform to the set of UEs.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 µs, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
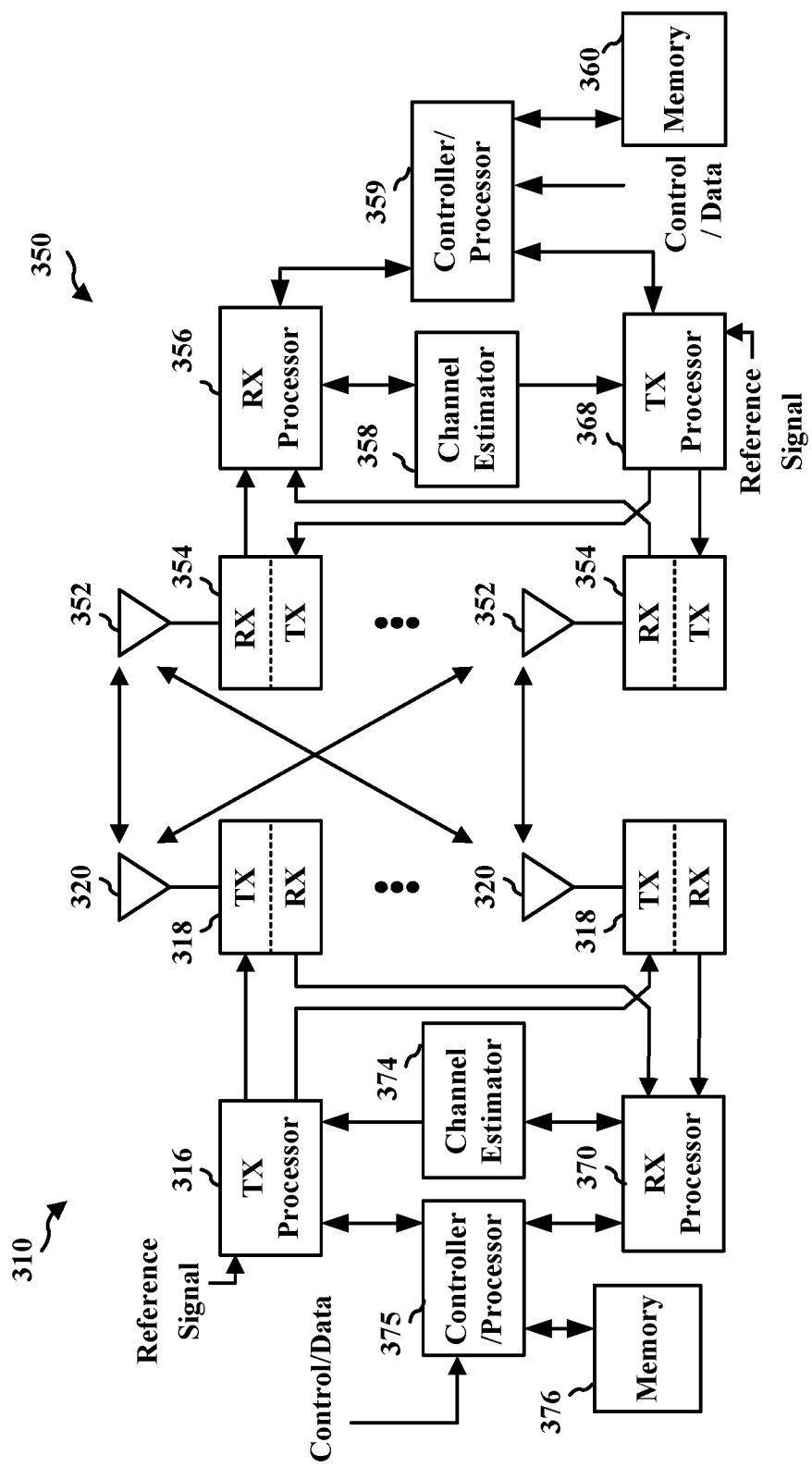
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communications, such as in higher NR operating bands, larger bandwidths and several waveforms may be utilized for downlink/uplink operation. For example, in cyclic prefix (CP) orthogonal frequency division multiplexing (OFDM) (CP-OFDM), which is CP based, may allow for a higher complexity, a single tap FDE, as well as an efficient use of beamwidth utilization. CP-OFDM may allow for frequency domain multiplexing (FDM) of low complexity, as well as an increased subcarrier spacing (SCS). CP-OFDM may also allow for an increased order of multiple input multiple output (MIMO). In some instances, for example, in single carrier frequency domain implementations (e.g., discreet Fourier transform spread OFDM (DFT-s-OFDM)), may be based on CP or GI, may allow for a higher complexity, a single tap frequency domain equalization (FDE), as well as an efficient use of bandwidth utilization. DFT-s-OFDM may allow for FDM with peak to average power ratio (PAPR) improvement, as well as an increased SCS. In some instances, for example, in single carrier time domain implementations (e.g., single carrier quadrature amplitude modulation (SC-QAM)), may be based on CP or GI, may allow for a reduced complexity in comparison to CP-OFDM or DFT-s-OFDM, a single tap FDE or time domain equalization (TDE), but may utilize guard bands. SC-QAM may allow for FDM with guard bands, which may be optimal for lower signal to noise ratio (SNR), while time domain filtering may result in a reduced PAPR. Higher frequency bands (e.g., greater than 100 GHz) may result in an increased phase noise, a need to lower PAPR, and may result in an increased UE complexity.

Figure 4:
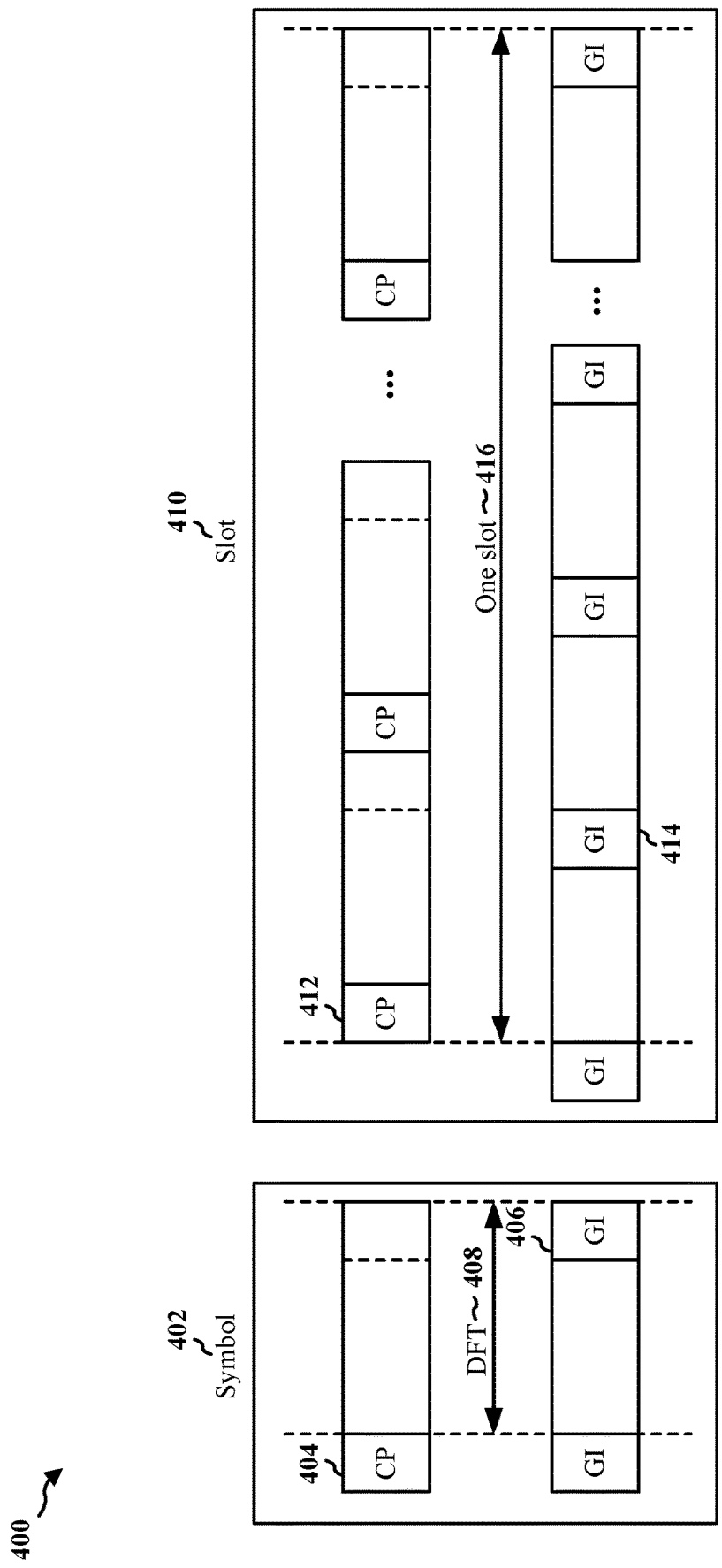
FIG. 4 is a diagram illustrating an example of a comparison of CP and GI.

FIG. 4 is a diagram 400 of a comparison of CP and GI. For example, for symbol 402, the CP 404 may be outside of the DFT 408, while the GI 406 may be inside the DFT 408. CP and GI may allow for linear convolution to circular convolution. CP may take the last few samples of the end of the symbol and put it at the beginning. CP is random data, but may be an inefficient use of resources due in part to a repetition of the last part of the symbol, which may increase overhead. CP may not be easily adaptable to delay spreads. Extending the CP length or reducing break slot alignments because the CP is outside of DFT. An increase in CP may require a change in the DFT size, which may affect performance. GI, conversely, comprise a shortened symbol and may comprise a known sequence and may be repeated at the beginning. Since GI may be a known sequence, it may not have an impact on overhead like CP. GI may be utilized for synchronization, channel estimation, or phase tracking. GI may be easily adaptable to delay spread. The size of GI may be increased by reducing the data size which may allow for DFT size to remain the same. GI may easily adapt to delay spread without changing the slot alignment or breaking the symbol alignment.

In some instances, for example at slot 410, the CP 412 may be of different lengths. For example, NCP may comprise 14 OFDM symbols per slot, while ECP may comprise 12 symbols per slot. In some instances, the GI 414 may comprise a uniform length across the symbols. For example, the GI 414 may have a length of 15 symbols per slot 416.

FIGS. 5A and 5B are diagrams 500, 520 of GI examples. The diagram 500 is an example of a GI implementation using zero-tail (ZT) where zeros may be appended at the end, or at the beginning, of the modulation symbols. For example, data 502 may be fed into DFT 506, then may be fed into IDFT 508, and then into the parallel to serial (P/S) 510. In ZT, zeros 504 may be inserted before the DFT 506 along with the data 502, and zeros 504 may also be inserted before the IDFT 508, such that at the transmitter, the symbol would have data 516 and then a tail of zeros 518 (or low integers). To change the length of the tail 518, the number of zeros 504 may be increased, which results in a decrease of data 516.

The diagram 520 is an example of GI implementation using unique word (UW), which may be similar to ZT, but instead of adding zeros, a fixed or known sequence 522 is appended to the end of the modulation symbols. The fixed or known sequence 522 may be inserted before the DFT 506 along with the data 502. The symbol may have data 524 where the tail 526 is based on the fixed or known sequence 522.

Aspects presented herein provide a configuration to use different GI sequences for different FDM UEs. For example, a base station may determine a GI for multiple UEs from a set of UEs and multiplex data and the GI of the respective UEs to generate a waveform. At least one advantage of the disclosure is that using a GI-based waveform allows for the ability to adapt the GI length without changing the DFT size. Different UEs may have different delay spreads and may need to be multiplexed in frequency. In addition, different information signaling may be allowed using GI. For example, different information may be conveyed to different UEs which may occur using different GI sequences. GI sequences may have different initializations that may be UE dependent. At least another advantage of the disclosure is that different GI sequences or different GI lengths may be used for different FDM UEs.

Figure 6A:
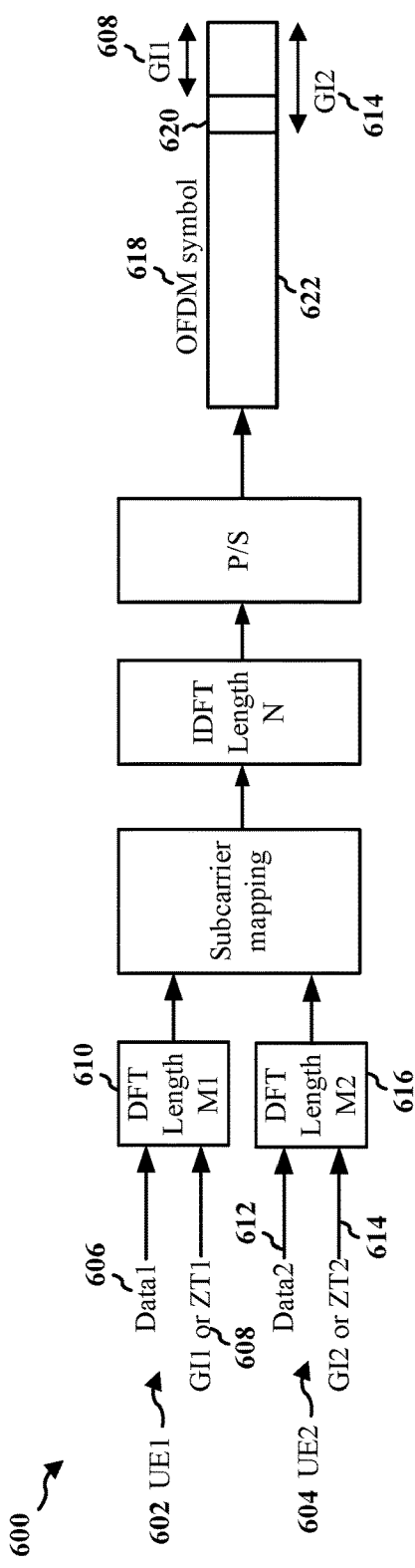
FIG. 6A is a diagram illustrating an example of DFT-s-OFDM GI-based waveform.
Figure 6B:
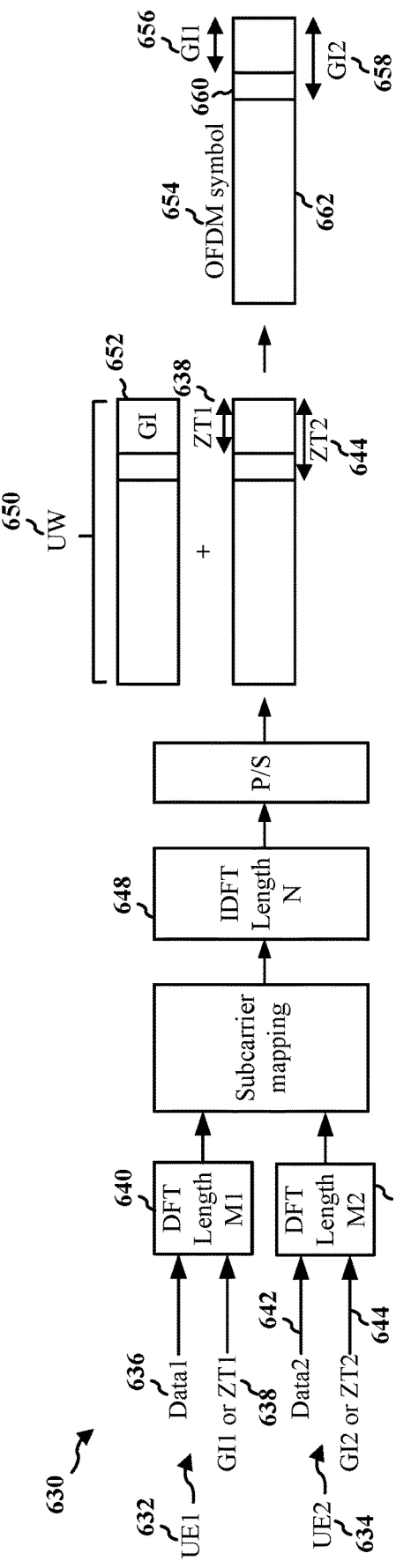
FIG. 6B is a diagram illustrating an example of DFT-s-OFDM GI-based waveform.

FIGS. 6A and 6B are diagrams 600, 630 of DFT-s-OFDM GI-based waveforms. In some instances, for a DFT-s-OFDM GI-based waveform, different UE may be frequency domain multiplexed using different GI configurations. For example, the different GI configurations may comprise different GI sequences or different GI lengths. With reference to diagram 600 of FIG. 6A, the GIs may be multiplexed before the DFT. For example, data1 606 may be multiplexed with GI1 or ZT1 608 before the DFT 610. The data1 606 may correspond to data for UE1 602. In addition, data2 612 may be multiplexed with GI2 or ZT2 614 before DFT 616. The data2 612 may correspond to data for UE2 604. After the subcarrier mapping, the IDFT, and the P/S, the resultant OFDM symbol 618 may comprise a combination of data1 606 and data2 612, the GI1 608, and the GI2 614. GI1 608 may be shorter or less than GI2 614. A portion 624 of the OFDM symbol 618 may overlap with GI2 614. The portion 624 may correspond to an end of the data portion of data1 606 that overlaps with GI2 614.

With reference to diagram 630 of FIG. 6B, the GI 652 may be multiplexed after the IDFT 648. In the example of diagram 630, data1 636 may be multiplexed with ZT1 638 at DFT 640. Data1 636 may correspond to the data for UE 632. Data2 642 may be multiplexed with ZT2 644 at DFT 640. Data2 642 may correspond to the data for UE 634. After the subcarrier mapping, IDFT 648, and P/S, the GI 652 may be combined with the data, in the time domain, by using a unique word 650. The unique word 650 may comprise the GI 652 and may be combined with the data which results in the OFDM symbol 654. The OFDM symbol may comprise a GI1 656, a GI2 658, a portion 660, and the combined data portion 662. GI1 656 and GI2 658 have the same GI sequence based on GI 652, but each have different GI lengths. The combined data portion 662 comprises the data1 636 and data2 642. The portion 660 may comprise an end of the data portion of data 1 636 that overlaps with the GI2 658. The GI 652 may or may not be precoded.

Figure 7:
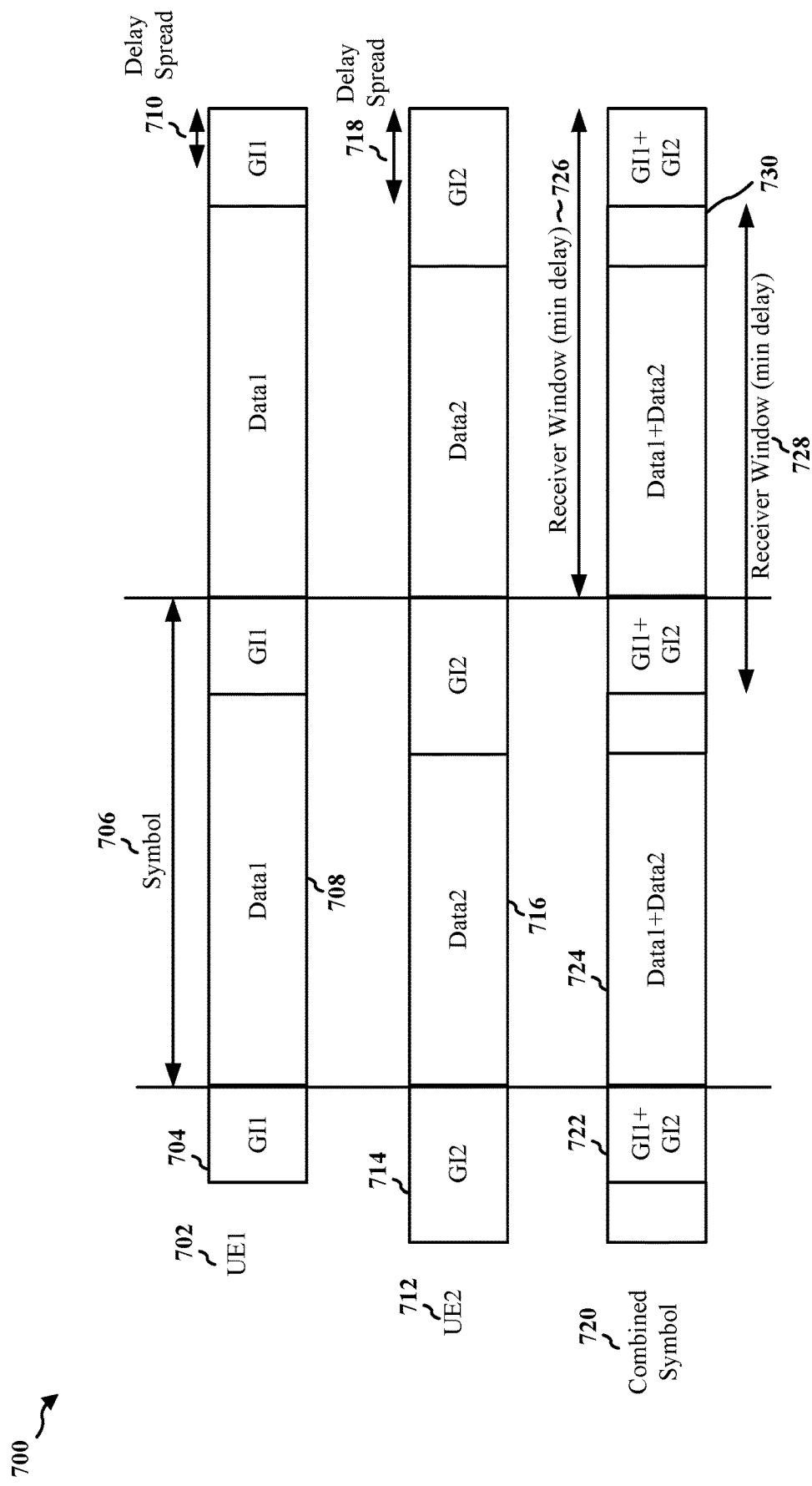
FIG. 7 is a diagram illustrating an example of GIs of different lengths.

FIG. 7 is a diagram 700 of GIs of different lengths. The GIs (e.g., GI1 704, GI2 714) may comprise ZT or UW. The symbol 706 may be generated as described in the example of FIG. 6A or 6B. Data1 708 may correspond to data for UE1 702. Data2 716 may correspond to data for UE2 712. The combined symbol 720 may be achieved by combining the symbols 706 for the data corresponding to UE1 702 and UE2 712. Each UE may also comprise a delay spread. UE1 702 comprises a delay spread 710, and UE2 712 comprises a delay spread 718. The GIs of different lengths may be added together so long as the delay spread of the UE with the longest GI is not longer than the GI of the UE with the shortest GI. In the example of diagram 700, the UE with the longest GI is UEs 712, and the UE with the shortest GI is UE1 702. The delay spread 718 of UE2 712 does not exceed the length of GI1 710 of UE1 702. If the delay spread of the UE with the longest GI exceeds the length of the shortest GI, then the delay spread of the UE with the longest GI may spill over into the data portion of the UE with the shortest GI, which may break the circular property of the UE with the shortest GI. As such, the maximum delay spread of the longest GI length that is multiplexed should not exceed the shortest GI length that is multiplexed. This may be possible since the GI length may be designed to be greater than the delay spread, such that the shortest GI length may have some extra room to spare. The condition that the maximum delay spread of the longest GI length does not exceed the shortest GI lengths is to ensure that the circular properties of any of the UEs are maintained and not broken. Maintaining circular properties allows for reliable frequency domain equalization. In addition, the data portion 730 of the combined symbol 720 is data dependent, such that breaking circular property may negatively impact the data within data portion 730. The receiver window 726 may correspond to the minimum delay for UE1 702. The receive window 728 may correspond to the minimum delay for UE2 712.

Figure 8:
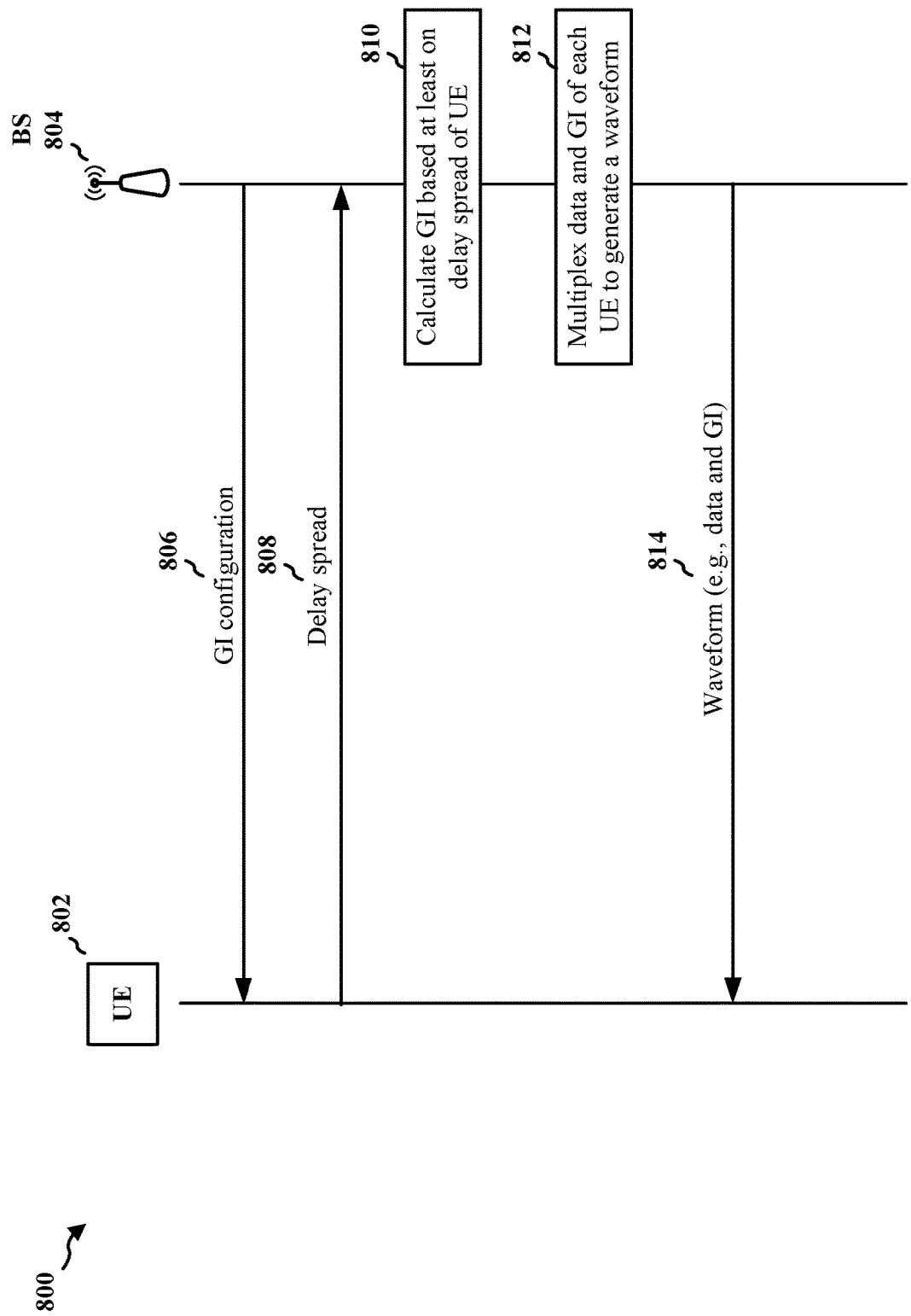
FIG. 8 is a call flow diagram of signaling between a UE and a base station.

FIG. 8 is a call flow diagram 800 of signaling between a UE 802 and a base station 804. The base station 804 may be configured to provide at least one cell. The UE 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a UE 802 may correspond to at least UE 104. In another example, in the context of FIG. 3, the base station 804 may correspond to base station 310 and the UE 802 may correspond to UE 350.

At 806, the UE 802 may receive a configuration for a GI. The UE 802 may receive the configuration for the GI from the base station 804. The base station 804 may transmit the configuration for the GI to the UE 802. The UE 802 may be within a set of UEs. In some aspects, the GI may be based at least on location information of the base station 804 and each UE from a set of UEs, based on an estimation by the base station 804, or based on a delay spread associated with each UE from a set of UEs. In some aspects, the GI of each UE from a set of UEs may comprise a ZT or a UW. In some aspects, a maximum delay spread of a first UE having a greatest GI length may be equal to or less than a GI length of a second UE having a smallest GI length. The first UE and the second UE may be comprised within the set of UEs.

At 808, the UE 802 may transmit a delay spread associated with the UE 802. The UE 802 may transmit the delay spread associated with the UE 802 to the base station 804 based on the configuration for the GI. The base station 804 may receive the delay spread associated with the UE 802. In some instances, the base station 804 may receive the delay spread from each UE from the set of UEs.

At 810, the base station 804 the base station may calculate a GI of each UE 802 from a set of UEs. The base station 804 may calculate the GI of each UE 802 from the set of UEs based at least one a delay spread associated with each respective UE from the set of UEs. In some aspects, calculation of the GI may be based at least on location information of the base station 804 and each respective UE 802 from the set of UEs or based on an estimation by the base station. In some aspects, the GI of each UE from the set of UEs comprises a ZT or a UW. In some aspects, a maximum delay spread of a first UE having a greatest GI length is equal to or less than a GI length of a second UE having a smallest GI length. The first UE and the second UE may be comprised within the set of UEs.

At 812, the base station 804 may multiplex data and the GI of each respective UE 802 from the set of UEs. The base station 804 may multiplex the data and the GI of each respective UE 802 from the set of UEs to generate a waveform. In some aspects, the data and the GI of each respective UE from the set of UEs may be frequency domain multiplexed. In some aspects, different GI configurations may be used to frequency domain multiplex the data and the GI of each respective UE from the set of UEs. In some aspects, the different GI configurations may comprise GIs having different sequences or GIs having different lengths.

In some aspects, to multiplex the data and the GI of each respective UE from the set of UEs, the base station 804 may multiplex the GI of each respective UE from the set of UE prior to performing a DFT operation on the GI and the data. In some aspects, the GI of each respective UE from the set of UEs may comprise different GI sequences or different GI lengths. In some aspects, the GI of each respective UE from the set of UEs may be preconfigured.

In some aspects, to multiplex the data and the GI of each respective UE from the set of UEs, the base station may multiplex the GI of each respective UE from the set of UEs after performing an IDFT operation to generate the waveform. In some aspects, the GI of each respective UE from the set of UEs may comprise a same GI sequence or different GI lengths. In some aspects, the GI of each respective UE from the set of UEs may be preconfigured.

At 814, the base station 804 may transmit the waveform. The base station may transmit the waveform to each respective UE of the set of UEs. The UE 802 may receive the waveform from the base station 804. The waveform may include data and the GI. The UE 802 may receive the waveform including the data and the GI from the base station 804 based at least on the configuration for the GI. In some aspects, the waveform may be based on the delay spread associated with the UE 802. In some aspects, the data and the GI may be frequency domain multiplexed. The UE 802 may be comprised within a set of UEs. In some aspects, different GI configurations may be used to frequency domain multiplex the data and the GI of each respective UE from the set of UEs. In some aspects, the different GI configurations may comprise GIs having different sequences or GIs having different lengths.

Figure 9:
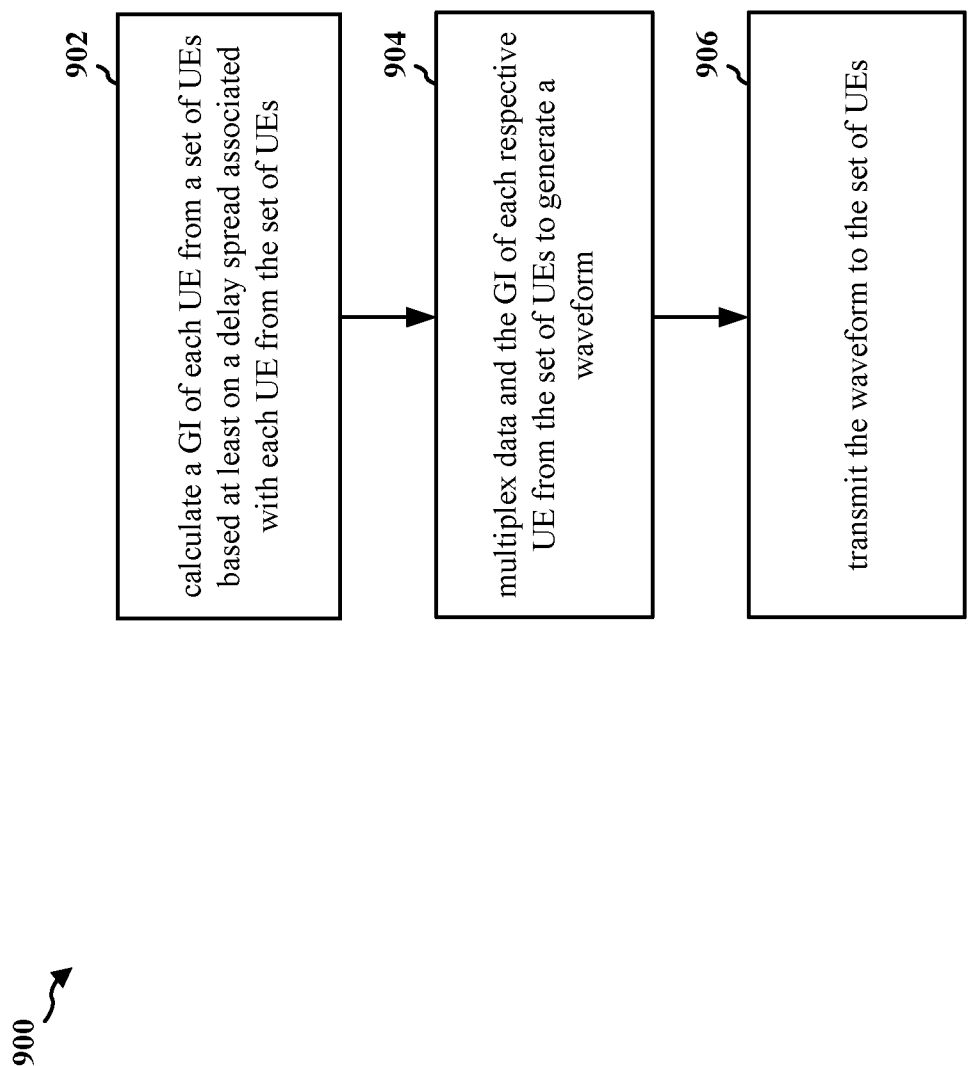
FIG. 9 is a flowchart of a method of wireless communication.

FIG. 9 is a flowchart 900 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to multiplex data for different UEs using different GI configurations.

At 902, the base station may calculate a GI of each UE from a set of UEs. For example, 902 may be performed by delay spread component 1140 of apparatus 1102. The base station may calculate the GI of each UE from the set of UEs based at least one a delay spread associated with each UE from the set of UEs. In some aspects, calculation of the GI may be based at least on location information of the base station and each UE from the set of UEs or based on an estimation by the base station. In some aspects, the GI of each UE from the set of UEs comprises a ZT or a UW. In some aspects, a maximum delay spread of a first UE having a greatest GI length is equal to or less than a GI length of a second UE having a smallest GI length. The first UE and the second UE may be comprised within the set of UEs.

At 904, the base station may multiplex data and the GI of each respective UE from the set of UEs. For example, 904 may be performed by multiplex component 1144 of apparatus 1102. The base station may multiplex the data and the GI of each respective UE from the set of UEs to generate a waveform. In some aspects, the data and the GI of each respective UE from the set of UEs may be frequency domain multiplexed. In some aspects, different GI configurations may be used to frequency domain multiplex the data and the GI of each respective UE from the set of UEs. In some aspects, the different GI configurations may comprise GIs having different sequences or GIs having different lengths.

At 906, the base station may transmit the waveform. For example, 906 may be performed by waveform component 1146 of apparatus 1102. The base station may transmit the waveform to the set of UEs.

Figure 10:
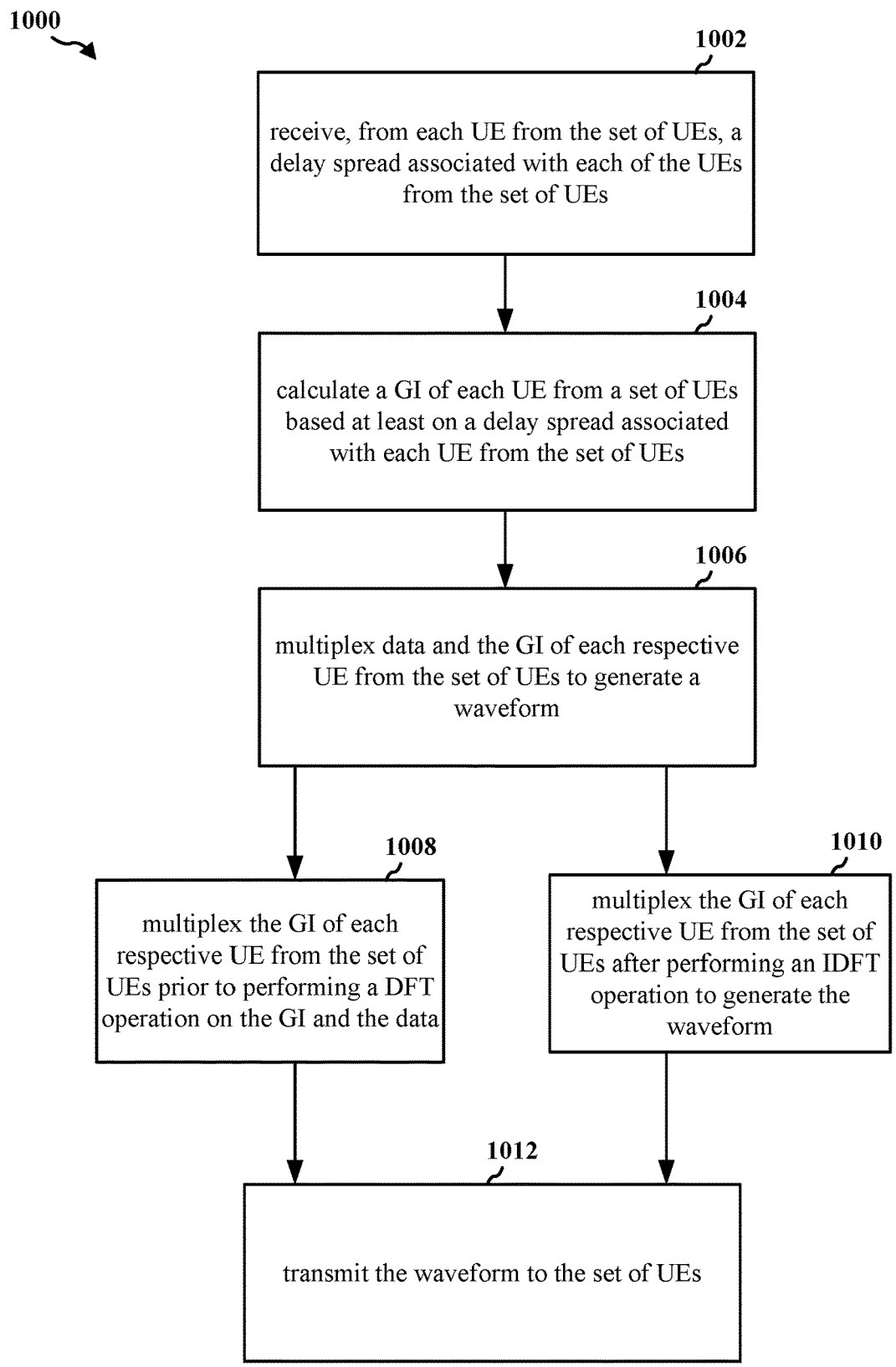
FIG. 10 is a flowchart of a method of wireless communication.

FIG. 10 is a flowchart 1000 of a method of wireless communication. The method may be performed by a base station or a component of a base station (e.g., the base station 102/180; the apparatus 1102; the baseband unit 1104, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to multiplex data for different UEs using different GI configurations.

At 1002, the base station may receive a delay spread associated with each of the UEs from a set of UEs. For example, 1002 may be performed by delay spread component 1140 of apparatus 1102. The base station may receive the delay spread from each UE from the set of UEs.

At 1004, the base station may calculate a GI of each UE from a set of UEs. For example, 1004 may be performed by delay spread component 1140 of apparatus 1102. The base station may calculate the GI of each UE from the set of UEs based at least one a delay spread associated with each UE from the set of UEs. In some aspects, calculation of the GI may be based at least on location information of the base station and each UE from the set of UEs or based on an estimation by the base station. In some aspects, the GI of each UE from the set of UEs comprises a ZT or a UW. In some aspects, a maximum delay spread of a first UE having a greatest GI length is equal to or less than a GI length of a second UE having a smallest GI length. The first UE and the second UE may be comprised within the set of UEs.

At 1006, the base station may multiplex data and the GI of each respective UE from the set of UEs. For example, 1006 may be performed by multiplex component 1144 of apparatus 1102. The base station may multiplex the data and the GI of each respective UE from the set of UEs to generate a waveform. In some aspects, the data and the GI of each respective UE from the set of UEs may be frequency domain multiplexed. In some aspects, different GI configurations may be used to frequency domain multiplex the data and the GI of each respective UE from the set of UEs. In some aspects, the different GI configurations may comprise GIs having different sequences or GIs having different lengths.

At 1008, to multiplex the data and the GI of each respective UE from the set of UEs, the base station may multiplex the GI of each respective UE from the set of UE. For example, 1008 may be performed by multiplex component 1144 of apparatus 1102. The base station may multiplex the GI of each respective UE from the set of UE prior to performing a DFT operation on the GI and the data. In some aspects, the GI of each respective UE from the set of UEs may comprise different GI sequences or different GI lengths. In some aspects, the GI of each respective UE from the set of UEs may be preconfigured.

At 1010, to multiplex the data and the GI of each respective UE from the set of UEs, the base station may multiplex the GI of each respective UE from the set of UEs. For example, 1010 may be performed by multiplex component 1144 of apparatus 1102. The base station may multiplex the GI of each respective UE from the set of UEs after performing an IDFT operation to generate the waveform. In some aspects, the GI of each respective UE from the set of UEs may comprise a same GI sequence or different GI lengths. In some aspects, the GI of each respective UE from the set of UEs may be preconfigured.

At 1012, the base station may transmit the waveform. For example, 1012 may be performed by waveform component 1146 of apparatus 1102. The base station may transmit the waveform to the set of UEs.

Figure 11:
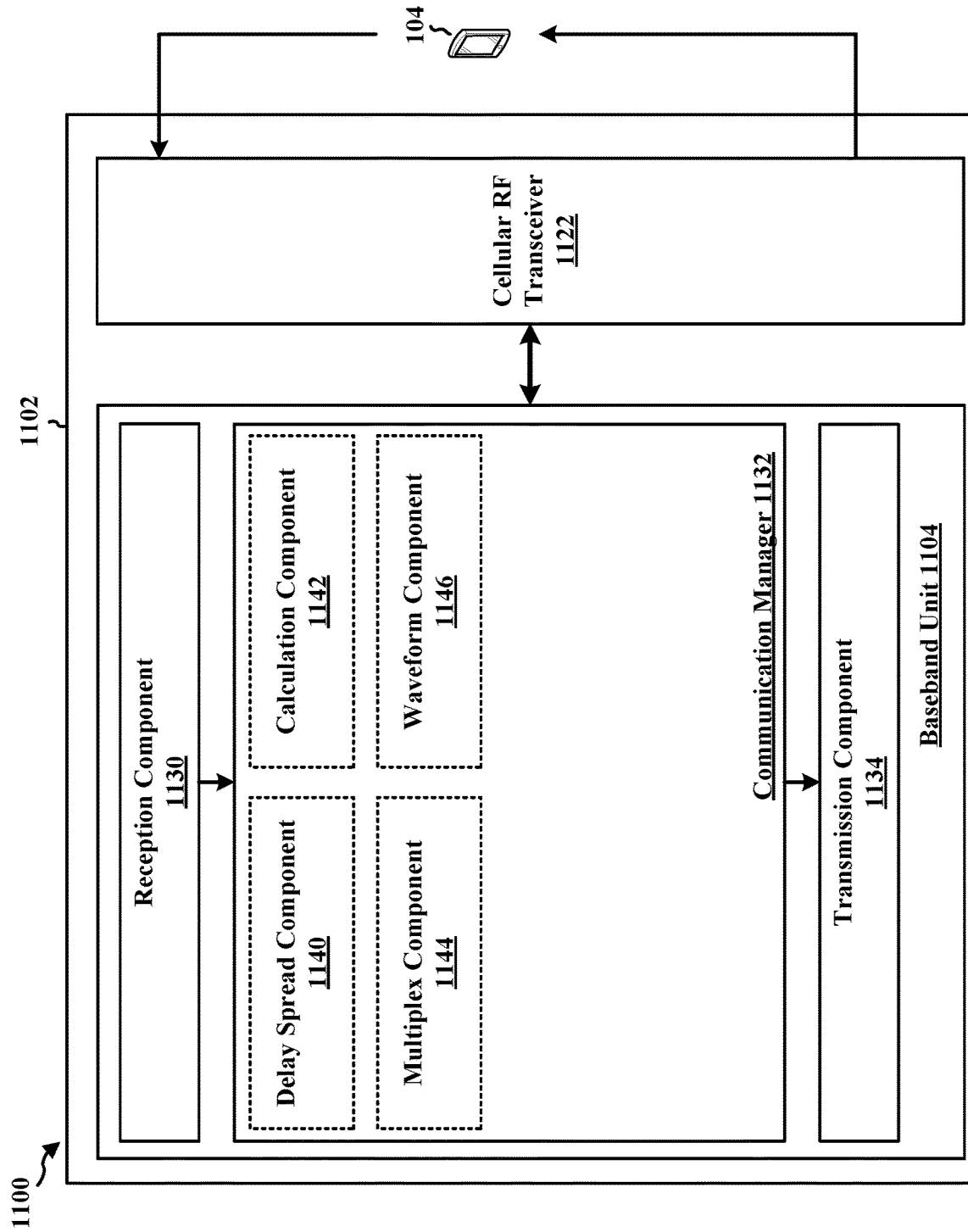
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a delay spread component 1140 that may receive a delay spread associated with each of the UEs from a set of UEs, e.g., as described in connection with 1002 of FIG. 10. The communication manager 1132 further includes a calculation component 1142 that may calculate a GI of each UE from a set of UEs, e.g., as described in connection with 902 of FIG. 9 or 1004 of FIG. 10. The communication manager 1132 further includes a multiplex component 1144 that may multiplex data and the GI of each respective UE from the set of UEs, e.g., as described in connection with 904 of FIG. 9 or 1006 of FIG. 10. The multiplex component 1144 may be further configured to multiplex the GI of each respective UE from the set of UE, e.g., as described in connection with 1008 or 1010 of FIG. 10. The communication manager 1132 further includes a waveform component 1146 that may transmit the waveform, e.g., as described in connection with 906 of FIG. 9 or 1012 of FIG. 10.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for calculating a GI of each UE from a set of UEs based at least on a delay spread associated with each UE from the set of UEs. The apparatus includes means for multiplexing data and the GI of each respective UE from the set of UEs to generate a waveform. The apparatus includes means for transmitting the waveform to the set of UEs. The apparatus further includes means for receiving, from each UE from the set of UEs, a delay spread associated with each of the UEs from the set of UEs. The apparatus further includes means for multiplexing the GI of each respective UE from the set of UEs prior to performing a DFT operation on the GI and the data. The apparatus further includes means for multiplexing the GI of each respective UE from the set of UEs after performing an IDFT operation to generate the waveform. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
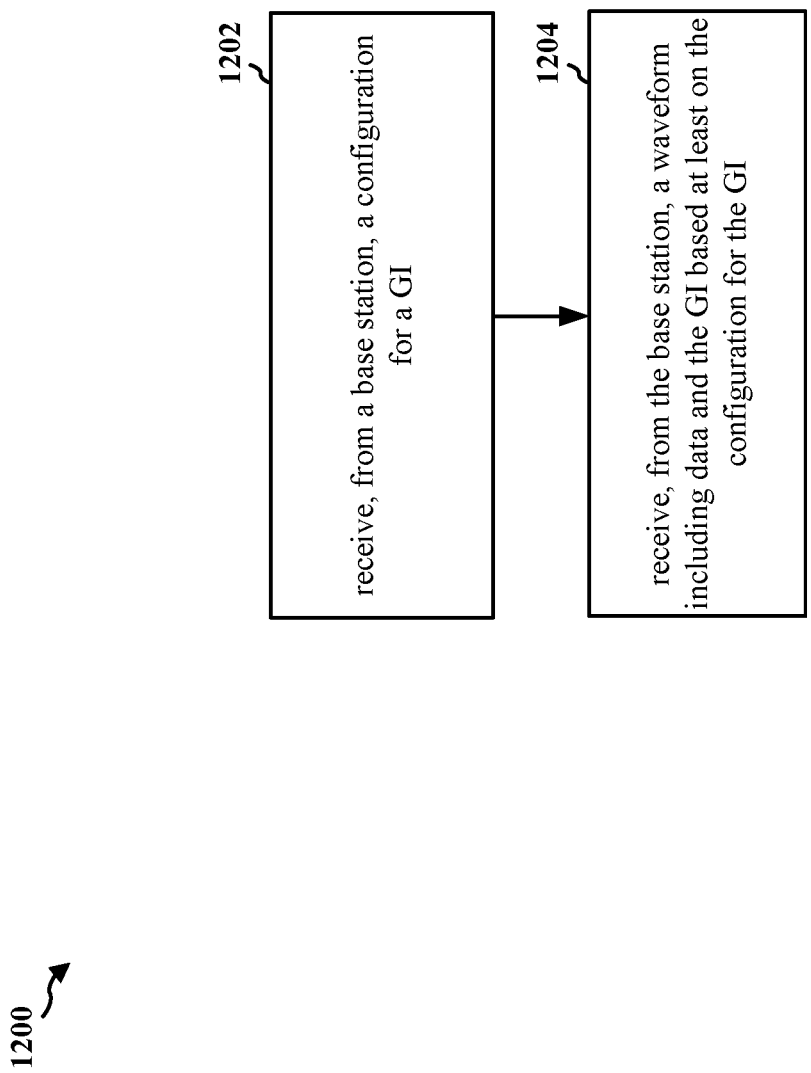
FIG. 12 is a flowchart of a method of wireless communication.

FIG. 12 is a flowchart 1200 of a method of wireless communication. The method may be performed by a UE or a component of a UE (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to receive a multiplexed waveform from a base station using different GI configurations.

At 1202, the UE may receive a configuration for a GI. For example, 1202 may be performed by GI component 1442 of apparatus 1402. The UE may receive the configuration for the GI from a base station. In some aspects, the GI may be based at least on location information of the base station and each UE from a set of UEs, based on an estimation by the base station, or based on a delay spread associated with each UE from a set of UEs. In some aspects, the GI of each UE from a set of UEs may comprise a ZT or a UW. In some aspects, a maximum delay spread of a first UE having a greatest GI length may be equal to or less than a GI length of a second UE having a smallest GI length. The first UE and the second UE may be comprised within the set of UEs.

At 1204, the UE may receive a waveform including data and the GI. For example, 1204 may be performed by waveform component 1444 of apparatus 1402. The UE may receive the waveform including the data and the GI from the base station. In some aspects, the data and the GI may be frequency domain multiplexed. The UE may be comprised within a set of UEs. In some aspects, different GI configurations may be used to frequency domain multiplex the data and the GI of each respective UE from the set of UEs. In some aspects, the different GI configurations may comprise GIs having different sequences or GIs having different lengths.

Figure 13:
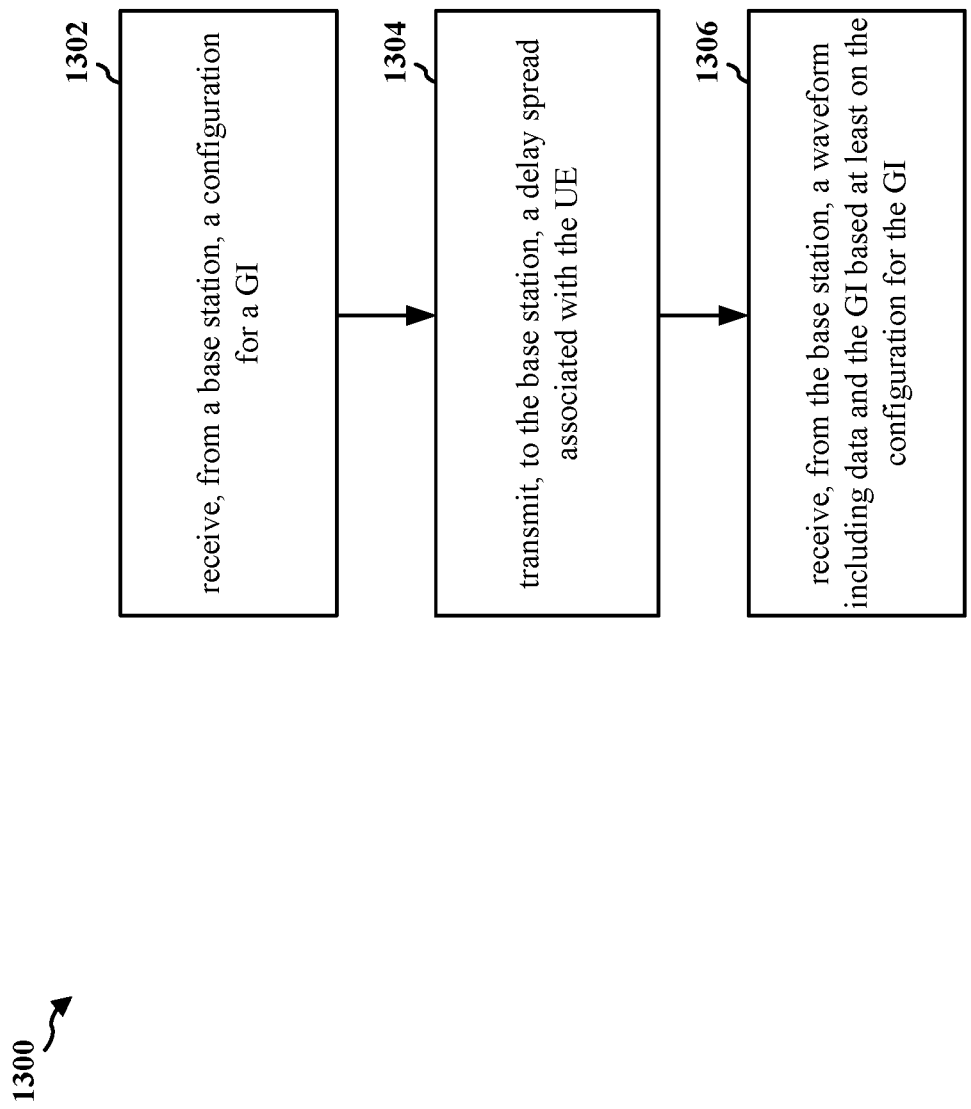
FIG. 13 is a flowchart of a method of wireless communication.

FIG. 13 is a flowchart 1300 of a method of wireless communication. The method may be performed by a UE or a component of a UE (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to receive a multiplexed waveform from a base station using different GI configurations.

At 1302, the UE may receive a configuration for a GI. For example, 1302 may be performed by GI component 1440 of apparatus 1402. The UE may receive the configuration for the GI from a base station. In some aspects, the GI may be based at least on location information of the base station and each UE from a set of UEs, based on an estimation by the base station, or based on a delay spread associated with each UE from a set of UEs. In some aspects, the GI of each UE from a set of UEs may comprise a ZT or a UW. In some aspects, a maximum delay spread of a first UE having a greatest GI length may be equal to or less than a GI length of a second UE having a smallest GI length. The first UE and the second UE may be comprised within the set of UEs.

At 1304, the UE may transmit a delay spread associated with the UE. For example, 1304 may be performed by delay spread component 1442 of apparatus 1402. The UE may transmit the delay spread associated with the UE to the base station based on the configuration for the GI.

At 1306, the UE may receive a waveform including data and the GI. For example, 1306 may be performed by waveform component 1444 of apparatus 1402. The UE may receive the waveform including the data and the GI from the base station. The UE may receive the waveform including the data and the GI from the base station based at least on the configuration for the GI. In some aspects, the waveform may be based on the delay spread associated with the UE. In some aspects, the data and the GI may be frequency domain multiplexed. The UE may be comprised within a set of UEs. In some aspects, different GI configurations may be used to frequency domain multiplex the data and the GI of each respective UE from the set of UEs. In some aspects, the different GI configurations may comprise GIs having different sequences or GIs having different lengths.

Figure 14:
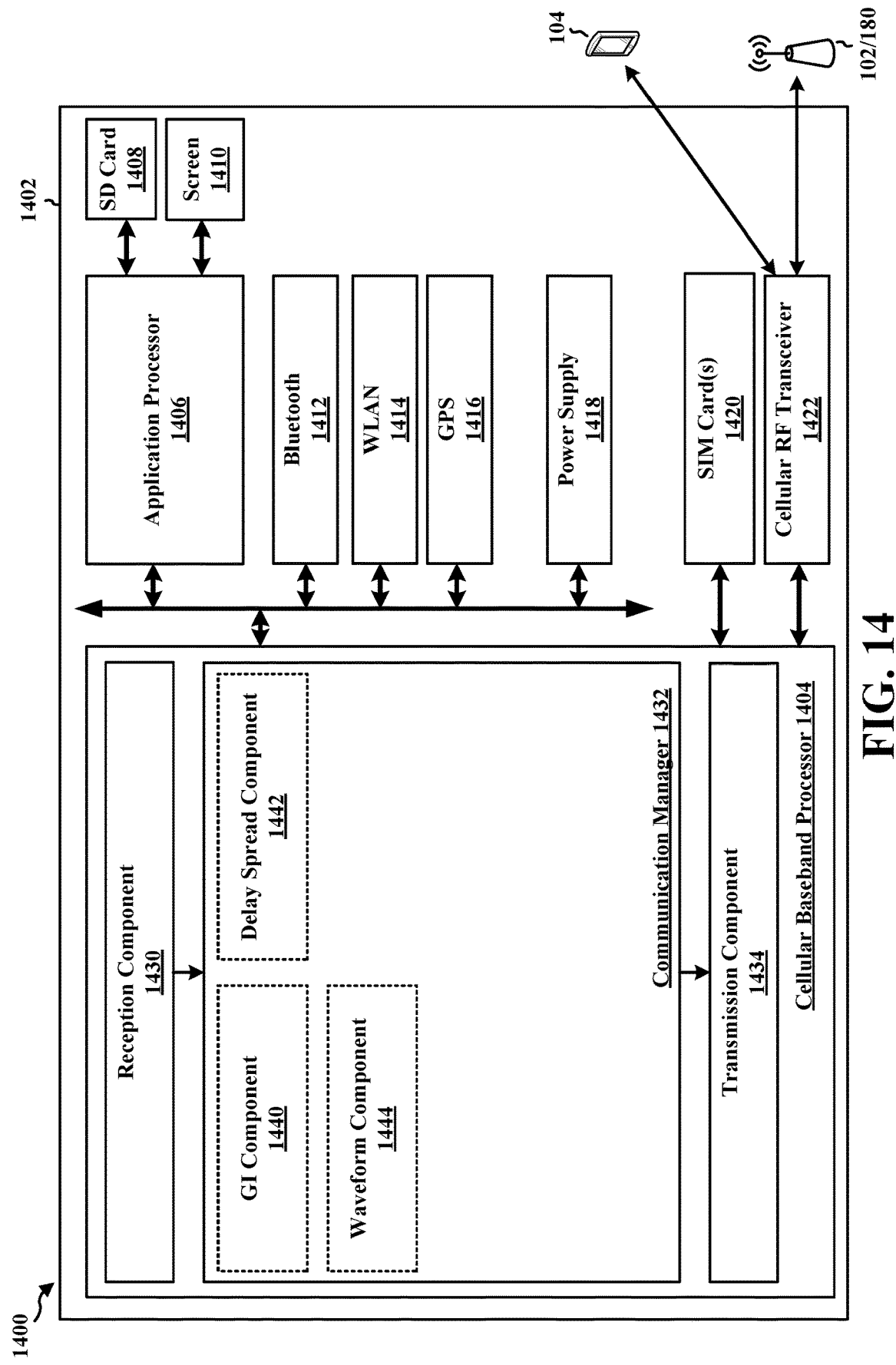
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/ memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a delay spread component 1440 that is configured to transmit a delay spread associated with the UE, e.g., as described in connection with 1302 of FIG. 13. The communication manager 1432 further includes a GI component 1442 that is configured to receive a configuration for a GI, e.g., as described in connection with 1202 of FIG. 12 or 1304 of FIG. 13. The communication manager 1432 further includes a waveform component 1444 that is configured to receive a waveform including data and the GI, e.g., as described in connection with 1204 of FIG. 12 or 1306 of FIG. 13.

The apparatus may include additional components that perform each of the blocks of the algorithm in the flowcharts of FIGS. 12 and 13. As such, each block in the flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from a base station, a configuration for a GI. The apparatus includes means for receiving, from the base station, a waveform including data and the GI based at least on the configuration for the GI. The apparatus further includes means for transmitting, to the base station, a delay spread associated with the UE. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to calculate a GI of each UE from a set of UEs based at least on a delay spread associated with each UE from the set of UEs; multiplex data and the GI of each respective UE from the set of UEs to generate a waveform; and transmit the waveform to the set of UEs.

Aspect 2 is the apparatus of aspect 1, further including a transceiver coupled to the at least one processor.

Aspect 3 is the apparatus of any of aspects 1 and 2, further includes that the data and the GI of each respective UE from the set of UEs are frequency domain multiplexed.

Aspect 4 is the apparatus of any of aspects 1-3, further includes that different GI configurations are used to frequency domain multiplex the data and the GI of each respective UE from the set of UEs.

Aspect 5 is the apparatus of any of aspects 1-4, further includes that the different GI configurations comprise GIs having different sequences or GIs having different lengths.

Aspect 6 is the apparatus of any of aspects 1-5, further includes that calculation of the GI is based at least on location information of the base station and each UE from the set of UEs or based on an estimation by the base station.

Aspect 7 is the apparatus of any of aspects 1-6, further includes that the at least one processor is further configured to receive, from each UE from the set of UEs, the delay spread associated with each UE from the set of UEs.

Aspect 8 is the apparatus of any of aspects 1-7, further includes that to multiplex the data and the GI of each respective UE from the set of UEs the at least one processor is further configured to multiplex the GI of each respective UE from the set of UEs prior to performing a DFT operation on the GI and the data.

Aspect 9 is the apparatus of any of aspects 1-8, further includes that the GI of each respective UE from the set of UEs comprise different GI sequences or different GI lengths.

Aspect 10 is the apparatus of any of aspects 1-9, further includes that the GI of each respective UE from the set of UEs are preconfigured.

Aspect 11 is the apparatus of any of aspects 1-10, further includes that to multiplex the data and the GI of each respective UE from the set of UEs the at least one processor is further configured to multiplex the GI of each respective UE from the set of UEs after performing an inverse discrete Fourier transform (IDFT) operation to generate the waveform.

Aspect 12 is the apparatus of any of aspects 1-11, further includes that the GI of each respective UE from the set of UEs comprise a same GI sequence or different GI lengths.

Aspect 13 is the apparatus of any of aspects 1-12, further includes that the GI of each respective UE from the set of UEs are preconfigured.

Aspect 14 is the apparatus of any of aspects 1-13, further includes that the GI of each UE from the set of UEs comprises a ZT or a UW.

Aspect 15 is the apparatus of any of aspects 1-14, further includes that a maximum delay spread of a first UE having a greatest GI length is equal to or less than a GI length of a second UE having a smallest GI length, wherein the first UE and the second UE are comprised within the set of UEs.

Aspect 16 is a method of wireless communication for implementing any of aspects 1-15.

Aspect 17 is an apparatus for wireless communication including means for implementing any of aspects 1-15.

Aspect 18 is a computer-readable medium storing computer executable code, where the code when executed by a processor causes the processor to implement any of aspects 1-15.

Aspect 19 is an apparatus for wireless communication at a UE including at least one processor coupled to a memory and configured to receive, from a base station, a configuration for a GI; and receive, from the base station, a waveform including data and the GI based at least on the configuration for the GI.

Aspect 20 is the apparatus of aspect 19, further including a transceiver coupled to the at least one processor.

Aspect 21 is the apparatus of any of aspects 19 and 20, further includes that the data and the GI are frequency domain multiplexed, wherein the UE is comprised within a set of UEs.

Aspect 22 is the apparatus of any of aspects 19-21, further includes that different GI configurations are used to frequency domain multiplex the data and the GI of each respective UE from the set of UEs.

Aspect 23 is the apparatus of any of aspects 19-22, further includes that the different GI configurations comprise GIs having different sequences or GIs having different lengths.

Aspect 24 is the apparatus of any of aspects 19-23, further includes that the GI is based at least on location information of the base station and each UE from a set of UEs, based on an estimation by the base station, or based on a delay spread associated with each UE from a set of UEs.

Aspect 25 is the apparatus of any of aspects 19-24, further includes that the at least one processor is further configured to transmit, to the base station, a delay spread associated with the UE.

Aspect 26 is the apparatus of any of aspects 19-25, further includes that the GI of each UE from a set of UEs comprises a ZT or a UW.

Aspect 27 is the apparatus of any of aspects 19-26, further includes that a maximum delay spread of a first UE having a greatest GI length is equal to or less than a GI length of a second UE having a smallest GI length, wherein the first UE and the second UE are comprised within the set of UEs.

Aspect 28 is a method of wireless communication for implementing any of aspects 19-27.

Aspect 29 is an apparatus for wireless communication including means for implementing any of aspects 19-27.

Aspect 30 is a computer-readable medium storing computer executable code, where the code when executed by a processor causes the processor to implement any of aspects 19-27.

What is claimed is:

1. An apparatus for wireless communication at a base station, comprising:
   a memory; and
   at least one processor coupled to the memory and configured to:
   calculate a guard interval (GI) of each user equipment (UE) from a set of UEs based at least on a delay spread associated with each UE from the set of UEs;
   multiplex data and the GI of each respective UE from the set of UEs to generate a waveform, wherein the data and the GI of each respective UE from the set of UEs are frequency domain multiplexed, wherein different GI configurations are used to frequency domain multiplex the data and the GI of each respective UE from the set of UEs, wherein the different GI configurations configure GIs having different lengths; and
   transmit the waveform to the set of UEs.

2. The apparatus of claim 1, further comprising a transceiver coupled to the at least one processor.

3. The apparatus of claim 1, wherein the different GI configurations configure the GIs having different sequences or the different lengths.

4. The apparatus of claim 1, wherein calculation of the GI is based at least on location information of the base station and each UE from the set of UEs or based on an estimation by the base station.

5. The apparatus of claim 1, wherein the at least one processor is further configured to:
   receive, from each UE from the set of UEs, the delay spread associated with each UE from the set of UEs.

6. The apparatus of claim 1, wherein to multiplex the data and the GI of each respective UE from the set of UEs the at least one processor is further configured to:

multiplex the GI of each respective UE from the set of UEs prior to performing a discrete Fourier transform (DFT) operation on the GI and the data.

7. The apparatus of claim 6, wherein the GI of each respective UE from the set of UEs comprise different GI sequences or different GI lengths.

8. The apparatus of claim 6, wherein the GI of each respective UE from the set of UEs are preconfigured.

9. The apparatus of claim 1, wherein to multiplex the data and the GI of each respective UE from the set of UEs the at least one processor is further configured to:
multiplex the GI of each respective UE from the set of UEs after performing an inverse discrete Fourier transform (IDFT) operation to generate the waveform.

10. The apparatus of claim 9, wherein the GI of each respective UE from the set of UEs comprise a same GI sequence or different GI lengths.

11. The apparatus of claim 9, wherein the GI of each respective UE from the set of UEs are preconfigured.

12. The apparatus of claim 1, wherein the GI of each UE from the set of UEs comprises a zero tail (ZT) or a unique word (UW).

13. The apparatus of claim 12, wherein a maximum delay spread of a first UE having a greatest GI length is equal to or less than a GI length of a second UE having a smallest GI length, wherein the first UE and the second UE are comprised within the set of UEs.

14. A method of wireless communication at a base station, comprising:
calculating a guard interval (GI) of each user equipment (UE) from a set of UEs based at least on a delay spread associated with each UE from the set of UEs;
multiplexing data and the GI of each respective UE from the set of UEs to generate a waveform, wherein the data and the GI of each respective UE from the set of UEs are frequency domain multiplexed, wherein different GI configurations are used to frequency domain multiplex the data and the GI of each respective UE from the set of UEs, wherein the different GI configurations configure GIs having different lengths; and
transmitting the waveform to the set of UEs.

15. The method of claim 14, further comprising:
receiving, from each UE from the set of UEs, the delay spread associated with each UE from the set of UEs.

16. The method of claim 14, wherein the multiplexing the data and the GI of each respective UE from the set of UEs comprises:
multiplexing the GI of each respective UE from the set of UEs prior to performing a discrete Fourier transform (DFT) operation on the GI and the data.

17. An apparatus for wireless communication at a user equipment (UE), comprising:
a memory; and
at least one processor coupled to the memory and configured to:

receive, from a base station, a configuration for a guard interval (GI); and
receive, from the base station, a waveform including data and the GI based at least on the configuration for the GI, wherein the data and the GI of the UE are frequency domain multiplexed with data and a GI for at least another UE from a set of UEs based on different GI configurations, wherein the UE is comprised within the set of UEs, wherein the different GI configurations used to frequency domain multiplex the data and the GI of each respective UE from the set of UEs configure GIs having different lengths.

18. The apparatus of claim 17, further comprising a transceiver coupled to the at least one processor.

19. The apparatus of claim 17, wherein the different GI configurations configure the GIs having different sequences or the different lengths.

20. The apparatus of claim 17, wherein the GI is based at least on location information of the base station and each UE from the set of UEs, based on an estimation by the base station, or based on a delay spread associated with each UE from the set of UEs.

21. The apparatus of claim 17, wherein the at least one processor is further configured to:
transmit, to the base station, a delay spread associated with the UE.

22. The apparatus of claim 17, wherein the GI of each UE from the set of UEs comprises a zero tail (ZT) or a unique word (UW).

23. The apparatus of claim 22, wherein a maximum delay spread of a first UE having a greatest GI length is equal to or less than a GI length of a second UE having a smallest GI length, wherein the first UE and the second UE are comprised within the set of UEs.

24. A method of wireless communication at a user equipment (UE), comprising:
receiving, from a base station, a configuration for a guard interval (GI); and
receiving, from the base station, a waveform including data and the GI based at least on the configuration for the GI, wherein the data and the GI of the UE are frequency domain multiplexed with data and a GI for at least another UE from a set of UEs based on different GI configurations, wherein the UE is comprised within the set of UEs, wherein the different GI configurations used to frequency domain multiplex the data and the GI of each respective UE from the set of UEs configure GIs having different lengths.

25. The method of claim 24, further comprising:
transmitting, to the base station, a delay spread associated with the UE.

26. The method of claim 24, wherein the GI of each UE from the set of UEs comprises a zero tail (ZT) or a unique word (UW).

* * * * *